(12) United States Patent
Zaretsky

(10) Patent No.: US 9,073,229 B2
(45) Date of Patent: Jul. 7, 2015

(54) EFFICIENT SELF-CLEANING FOOD CHOPPER

(71) Applicant: Howard Zaretsky, Rochester, NY (US)

(72) Inventor: Howard Zaretsky, Rochester, NY (US)

( * ) Notice: Subject to any disclaimer, the term of this patent is extended or adjusted under 35 U.S.C. 154(b) by 150 days.

(21) Appl. No.: 13/842,042

(22) Filed: Mar. 15, 2013

(65) Prior Publication Data

US 2014/0259683 A1 Sep. 18, 2014

(51) Int. Cl.
| | |
|---|---|
| *B26D 3/18* | (2006.01) |
| *A21C 15/04* | (2006.01) |
| *A47J 9/00* | (2006.01) |
| *B26B 3/04* | (2006.01) |

(52) U.S. Cl.
CPC ........ *B26D 3/185* (2013.01); *B26D 3/18* (2013.01); *A21C 15/04* (2013.01); *A47J 9/00* (2013.01); *B26B 3/04* (2013.01)

(58) Field of Classification Search
CPC .......... A21C 15/04; B26D 3/18; B26D 3/185; B26D 3/24; B26D 3/26; A47J 9/00; B26B 3/04
USPC ............. D7/672, 673; 30/114–117, 358–368, 30/303, 128; 83/932
See application file for complete search history.

(56) References Cited

U.S. PATENT DOCUMENTS

| | | | | | |
|---|---|---|---|---|---|
| 272,252 | A | * | 2/1883 | Hellenbrand | 30/303 |
| 1,175,512 | A | * | 3/1916 | Flemal | D7/693 |
| 1,364,863 | A | * | 1/1921 | Buchtel | 30/303 |
| 1,421,458 | A | * | 7/1922 | Gregory | 30/128 |
| 1,463,941 | A | * | 8/1923 | Cusimano | 30/303 |
| 1,962,737 | A | * | 6/1934 | Gutmann | 30/173 |
| 2,113,085 | A | * | 4/1938 | Higgs | 30/128 |
| D132,314 | S | * | 5/1942 | Melville | D7/672 |
| 2,293,345 | A | | 8/1942 | Kulp et al. | |
| 2,502,157 | A | * | 3/1950 | Klejna | D7/673 |
| 2,618,852 | A | * | 11/1952 | Clough | D7/673 |
| 2,679,688 | A | * | 6/1954 | Buschman | 30/117 |
| 3,696,849 | A | | 10/1972 | Davis | |
| 4,250,618 | A | * | 2/1981 | Custer et al. | 30/114 |
| D287,452 | S | * | 12/1986 | Stern | D7/673 |
| 4,625,404 | A | * | 12/1986 | Valente et al. | 30/114 |
| 5,303,473 | A | * | 4/1994 | Sadler | 30/128 |
| D356,718 | S | * | 3/1995 | Johannessen | D7/673 |

(Continued)

OTHER PUBLICATIONS

Nemco Easy Chopper product brochure, Sep. 2006.

(Continued)

*Primary Examiner* — Jason Daniel Prone

(74) *Attorney, Agent, or Firm* — Howard Zaretsky; Zaretsky Patent Group PC

(57) ABSTRACT

A novel and useful food chopper that includes a cutter having cutting edges arranged to form one or more cells and spring loaded plungers disposed and supported within the cells. The plungers include wipers extending around the circumference of the plungers at or near their bottoms. During a chopping cycle, the plungers are pushed back by the food to be chopped and compress their associated spring. When released, the wipers on each plunger squeegee the inner walls of the cell thereby achieving a cleaning action. Chopped food waste is minimized by careful placement of the wipers on the body of the plungers, placement of the plungers within the cells and by having a substantially flat bottom surface of the plungers which are mostly flush with the cutting edges of the cutter. Use of the wiper permits the food chopper to achieve very efficient chopping with minimal waste and a self-cleaning mechanism.

18 Claims, 10 Drawing Sheets

(56) References Cited

U.S. PATENT DOCUMENTS

| | | | | |
|---|---|---|---|---|
| D400,766 S | * | 11/1998 | Ferguson | D7/673 |
| 5,848,470 A | * | 12/1998 | Anderson | 30/303 |
| 5,946,809 A | * | 9/1999 | Bright | 30/358 |
| D416,177 S | * | 11/1999 | Hood | D7/673 |
| 5,979,281 A | | 11/1999 | Caesar | |
| D420,865 S | * | 2/2000 | Levy | D7/673 |
| 6,276,918 B1 | * | 8/2001 | Slaughter et al. | 30/124 |
| 6,945,486 B2 | | 9/2005 | Teng | |
| D567,037 S | * | 4/2008 | Taylor | D7/672 |
| 7,677,148 B2 | | 3/2010 | Rizvi | |
| 7,779,739 B2 | | 8/2010 | Peterson | |
| D634,590 S | * | 3/2011 | Ferguson | D7/673 |
| 8,371,199 B2 | | 2/2013 | Ghimire | |
| D680,816 S | * | 4/2013 | Patel et al. | D7/672 |
| D680,817 S | * | 4/2013 | Patel et al. | D7/672 |
| D680,824 S | * | 4/2013 | Patel et al. | D7/693 |
| D680,825 S | * | 4/2013 | Patel et al. | D7/693 |
| D680,826 S | * | 4/2013 | Patel et al. | D7/693 |
| 8,438,737 B2 | * | 5/2013 | Lo et al. | 30/114 |
| 8,677,895 B2 | | 3/2014 | Beber et al. | |
| 8,695,220 B2 | * | 4/2014 | Rhoads et al. | 30/114 |
| 8,857,325 B2 | * | 10/2014 | Brown | 30/303 |
| 8,985,491 B2 | | 3/2015 | Kent et al. | |
| 2004/0134327 A1 | * | 7/2004 | Capodieci | 83/932 |
| 2006/0218799 A1 | | 10/2006 | Kaposi | |
| 2007/0028785 A1 | * | 2/2007 | Foster et al. | 99/537 |
| 2008/0209737 A1 | * | 9/2008 | Storms | 30/114 |
| 2008/0271321 A1 | * | 11/2008 | Brunner et al. | 30/128 |
| 2011/0283548 A1 | * | 11/2011 | White | 30/301 |

OTHER PUBLICATIONS

RSVP International Garlic Cube product brochure, Feb. 2015.

* cited by examiner

EFFICIENT SELF-CLEANING FOOD CHOPPER

FIELD OF THE INVENTION

The present invention relates to the field of food stuff chopping, and more particularly relates to an efficient self-cleaning food chopper.

BACKGROUND OF THE INVENTION

Food choppers are well-known food preparation aids or tools that are in widespread use today. They are handy devices that are found in most kitchens and used frequently by chefs, cooks and others who prepare food. Although most do a reasonable job of chopping food, many accomplish this task with relatively large amounts of wasted food due to inefficiency of their chopping mechanisms.

In addition, many existing food choppers are notoriously difficult to clean due to the many nooks and crannies of their chopping mechanisms. This is especially true for most garlic presses and small food stuff choppers. Many have holes, openings, perforations, corners, etc. where chopped food accumulates and collects leading to large amounts of wasted food product as well as making it difficult to clean the chopper.

There is thus a need for a food chopper that is capable of chopping food stuff while wasting a minimal amount of food product. In addition, it is desirable to have a food chopper that is relatively easy to clean.

SUMMARY OF THE INVENTION

The present invention is a novel and useful food chopper that includes a cutter having cutting edges arranged to form one or more cells and spring loaded plungers disposed and supported within the cells. The plungers include wipers extending around the circumference of the plungers at or near their bottoms. During a chopping cycle, the plungers are pushed back by the food to be chopped and compress their associated spring. When released, the wipers on each plunger squeegee the inner walls of the cell thereby achieving a cleaning action. Chopped food waste is minimized by careful placement of the wipers on the body of the plungers, placement of the plungers within the cells and by having a substantially flat bottom surface of the plungers which are mostly flush with the cutting edges of the cutter. Use of the wiper permits the food chopper to achieve very efficient chopping with minimal waste and a self-cleaning mechanism.

Several advantages of the food chopper of the present invention include: (1) complete chopping of food stuff against a cutting surface such as a cutting board or table; (2) minimal wasted food product after a chopping cycle completed; and (3) self-cleaning mechanism eliminating or minimizing the need for the user to manually clean the chopper.

There is thus provided in accordance with the invention, a food chopper, comprising a housing, a cutter having one or more cutting edges arranged to form one or more cells having inner walls, one or more plungers, each plunger having a wiper and springedly moveable within a cell of said cutter, and wherein said wiper is operative to remove food from the inner walls of its respective cutter cell in response to movement of said plunger.

There is also provided in accordance with the invention, a food chopper, comprising a housing, a cutter having a plurality of cutting edges arranged to form a plurality of cells, each cell having inner walls, a plurality of plungers disposed within said plurality of cells, each plunger having a wiper extending substantially around the circumference thereof and adapted to be springedly moveable within a cell of said cutter, and wherein said wiper is operative to remove food from the inner walls of its associated cutter cell in response to movement of said plunger.

BRIEF DESCRIPTION OF THE DRAWINGS

The invention is herein described, by way of example only, with reference to the accompanying drawings, wherein.

DETAILED DESCRIPTION OF THE INVENTION

Figure 1A:
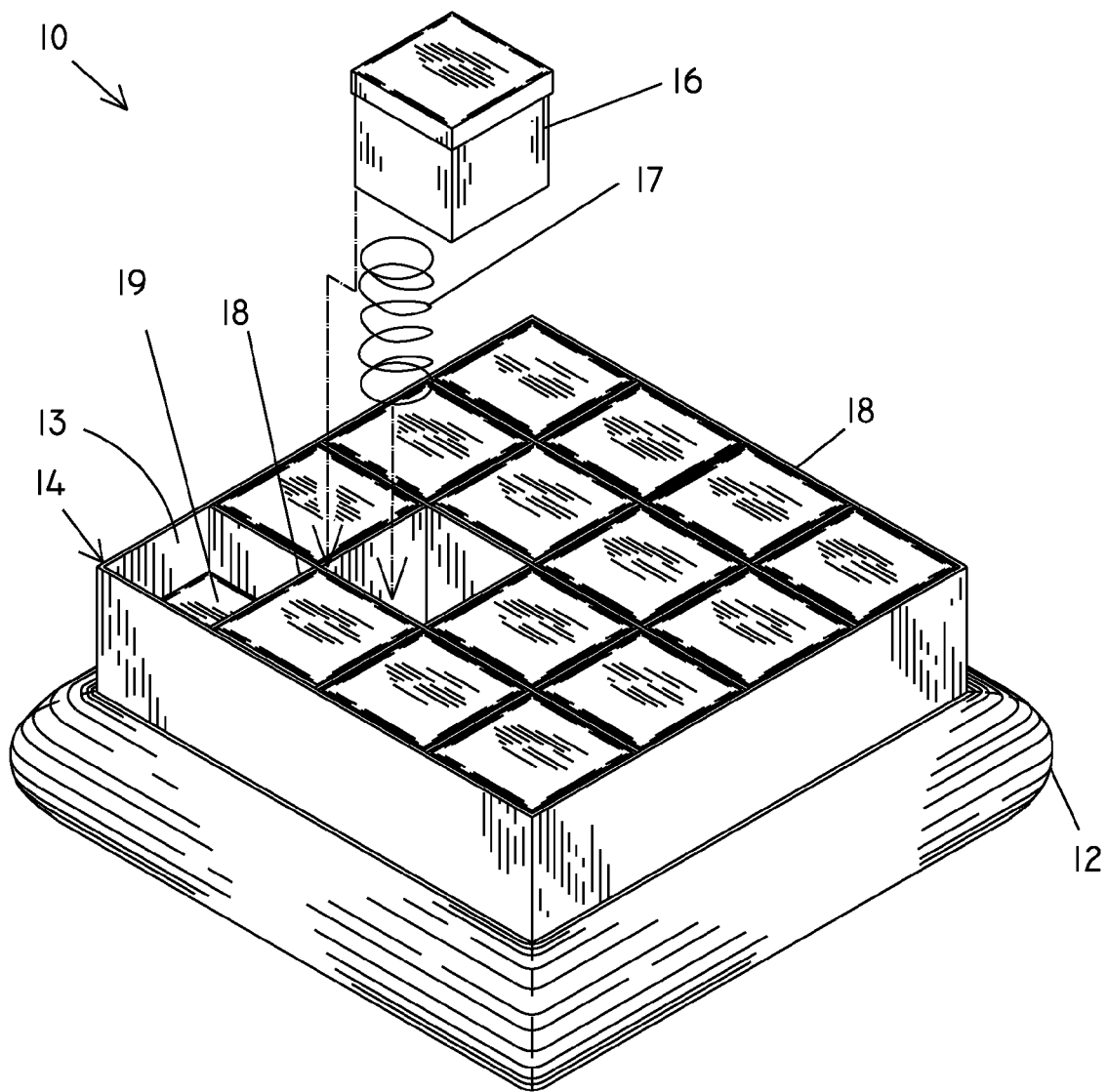
FIG. 1A is a diagram illustrating a perspective bottom view of the food chopper of the present invention.

A diagram illustrating a perspective bottom view of the food chopper of the present invention is shown in FIG. 1A. The food chopper, generally referenced 10, comprises a housing 12, a cutter or cutting assembly 14 having sharp cutting edges 18 and a plurality of plungers 16. Note that the chopper is symmetric from back to front (i.e. side to side). In one embodiment, the housing functions to provide support from the cutter and plungers as well provide a holding or gripping surface for a user's hand to operate the chopper. The housing may be constructed from any suitable material such as food safe plastic, wood, metal, rubber, polymers, etc.

In one embodiment, the cutter comprises an array of cutting edges that form a plurality of cells in a grid pattern including a plurality of cells 13. Each cell 13 has one plunger disposed within it. The plunger is able to move up and down within a cell using, for example, a telescopic motion. A biasing mechanism such as spring mechanism 17 is affixed to the top portion of each plunger. Note that plunger 19 is shown in a compressed (or retracted) state in one corner of the chopper and all other plungers 16 are shown in an extended uncompressed idle position. In some embodiments, the biasing member may include a plurality of springs, leaf or blade type springs, etc. For example, in some embodiments, the biasing member may be formed from a polymer spring which may be formed separately from, or integrally with, a corresponding plunger.

Figure 1B:
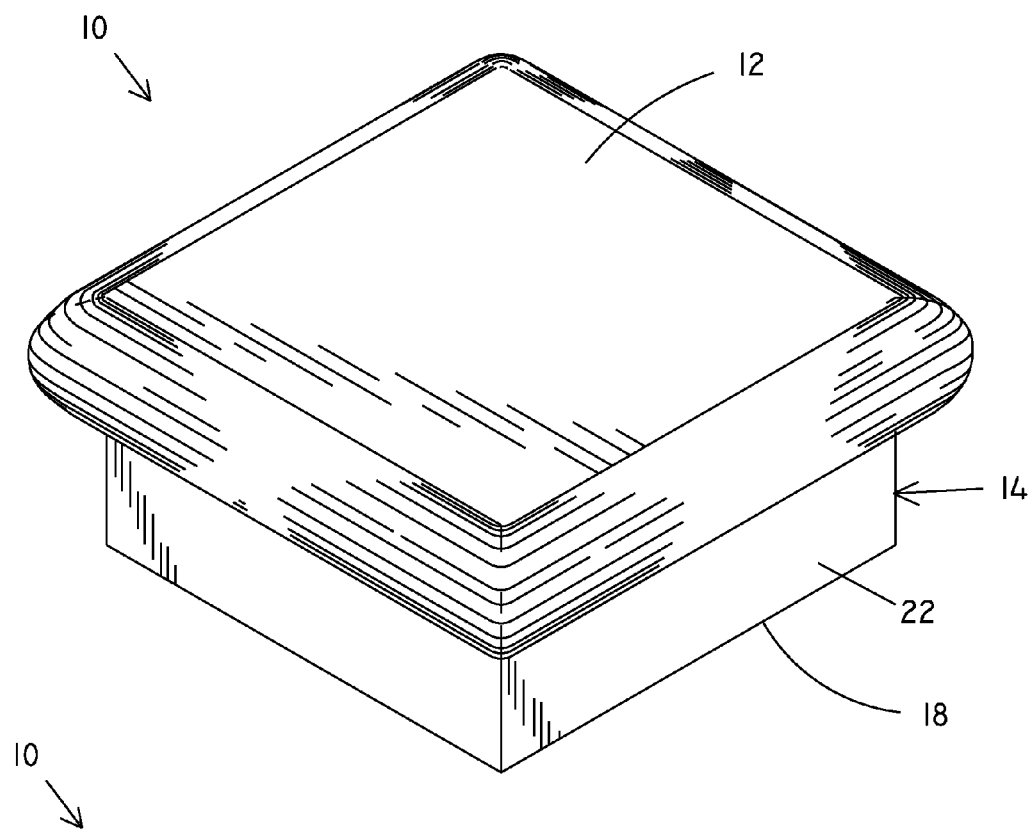
FIG. 1B is a diagram illustrating a perspective top view of the food chopper of the present invention.

A diagram illustrating a perspective top view of the food chopper of the present invention is shown in FIG. 1B. The portion of the chopper 10 shown includes the housing/handle 12, cutter 14, cutting edges 18 and outer wall 22 of the cutter.

Figure 1C:
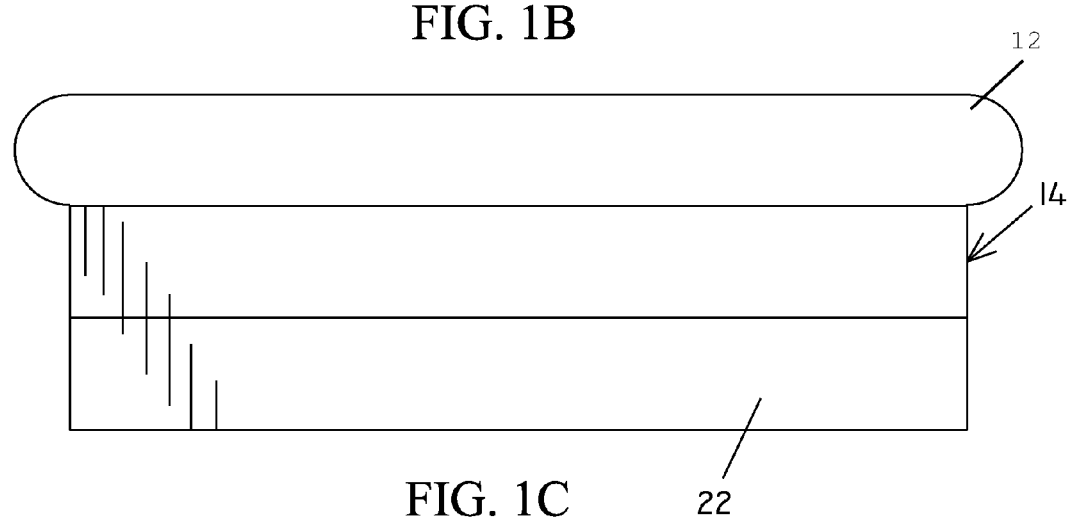
FIG. 1C is a diagram illustrating a side view of the food chopper of the present invention.

A diagram illustrating a side view of the food chopper of the present invention is shown in FIG. 1C. The portion of the chopper 10 shown includes housing/handle 12, cutter 14 and outer wall 22 of the cutter.

Figure 1D:
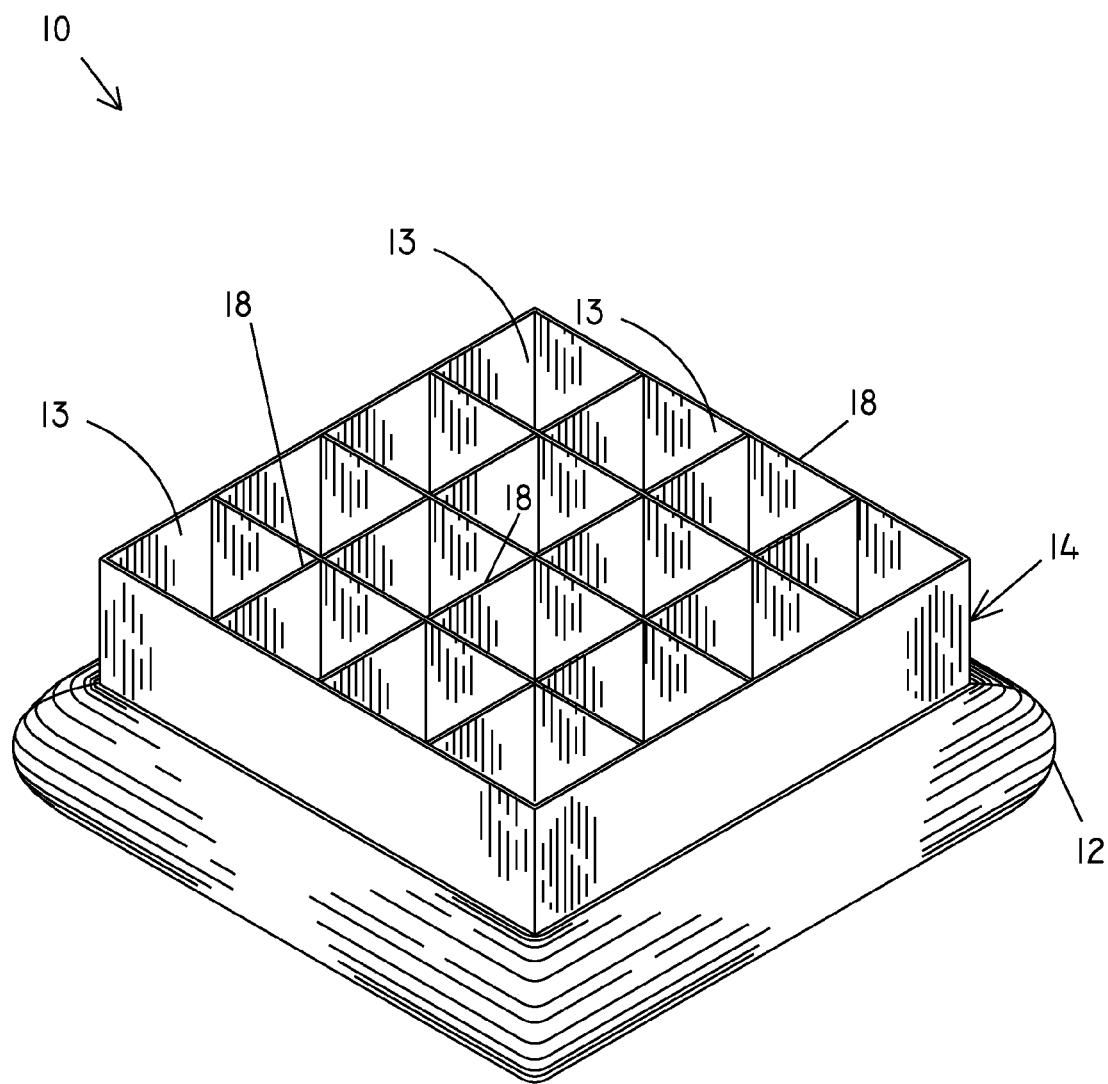
FIG. 1D is a diagram illustrating a perspective bottom view of a portion of the food chopper of the present invention.

A diagram illustrating a perspective bottom view of a portion of the food chopper of the present invention is shown in FIG. 1D. The plungers and associated springs have been removed to better illustrate the cells in which the plungers are mounted. The portion of the chopper 10 shown includes housing/handle 12, cutter 14, plurality of cells 13 and cutting edges 18.

Figure 2:
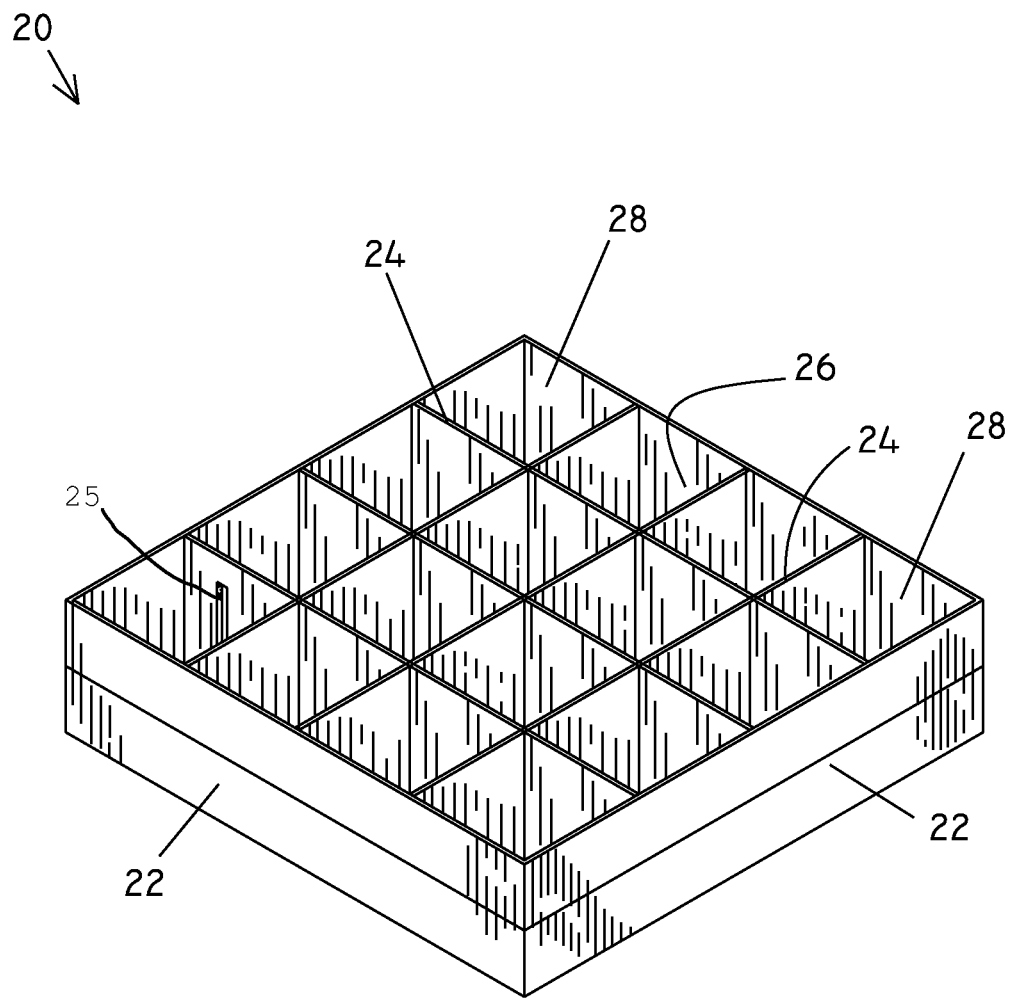
FIG. 2 is a diagram illustrating a top perspective view of the cutter assembly portion of the chopper.

A diagram illustrating a top perspective view of the cutter assembly portion of the cutter portion (hereinafter the cutter) is shown in FIG. 2. The cutter, generally referenced 20, comprises outer side walls 22 and a plurality of cross members 24 arranged to form a plurality of cells 28 having inner walls 26. The bottom edges of the outer side walls and cross members are sharpened and used to cut and chop food stuff. The outer side walls and/or cross members may be formed, at least in part, by blade portions each having a sharpened edge adjacent to the bottom edge of the cutter.

In the example embodiment shown, the cutter comprises a square or rectangular shape wherein the cells formed are squares or rectangles. It is appreciated that the cutter may be adapted to have any desired shape depending on the implementation. For example, the cutter may have comprise triangular shaped cells with each cell (other than cells on the outer edge of the cutter) abutting a neighboring cell on all three sides. In another embodiment, the cutter may comprise circular shaped cells where the space between cells may be unoccupied by a plunger. In yet other embodiments, it is envisioned that the cells may have other polygonal shapes such as rectangular, hexagonal, octagonal, etc. or combinations thereof. These cells may share one or more common walls. Further, regardless of cell shape, each plunger should correspond with the shape of a corresponding cell.

In one embodiment the cutter is made of metal such as stainless steel where the cross members are coupled to each other and/or to the outer side members using any suitable method such as welding, notching, etc. It is appreciated that the cutter may be made from any material, e.g., food safe plastic, etc., that is able to cut and chop food stuff without significant denting, dinging or premature dulling of the cutting edges. The cutter and/or the plungers may include a non-stick surface coating, if desired, to prevent food items sticking thereto.

Figure 3:
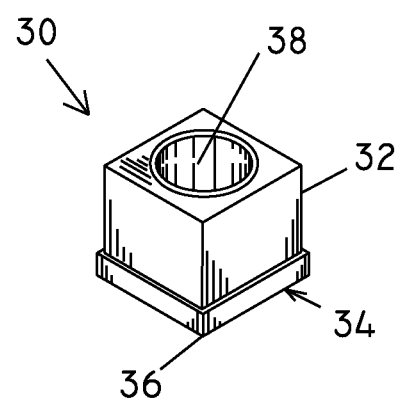
FIG. 3 is a top perspective view of a single plunger portion of the chopper.

A top perspective view of a single plunger portion of the chopper is shown in FIG. 3. In one embodiment, the plunger, generally referenced 30, comprises a plunger body 32, wiper portion 34 and detent 38. One plunger is springedly disposed in each cell of the cutter. In use, the plunger moves up and down within its associated cell. Regardless of the shape of the cutter, the plungers are adapted such that the wiper portion 34 fits snug against the inner walls of the cell. Thus, the plungers have a shape that is complementary to the cells of the cutter. In the example embodiment shown, the corner section 36 of the wiper fits snug (while allowing for telescopic motion within the cell) in the corner of the inner walls of the cell. The wiper extends around the full circumference of the plunger body. In yet other embodiments, however, the wiper may extend about the circumference of the plunger body in a discontinuous manner, if desired. In one embodiment, the plunger comprises an opening or recess 38 adapted to receive a portion of the spring or other biasing mechanism.

In use, the wipers function to provide a squeegee effect when the plungers move up and down (e.g., telescopes) within a cell. As described in more detail infra, when food is chopped, the wipers act to remove via the squeegee effect any food that came in connect with the inner walls of the cell. Thus, the wiper material is preferably compressible such as rubber or rubberized plastic to be able to squeegee the inner walls of the cells. The plunger and/or wiper may be made of any suitable material. For example, in some embodiments, the plunger and/or wiper may be made from materials such as a polymer, an elastomeric rubber, plastic, and/or any combination thereof as long as the wiper is capable of squeegeeing the inner walls of the cells. Further, in yet other embodiments, the plunger may be formed from wood or the like.

Figure 4A:
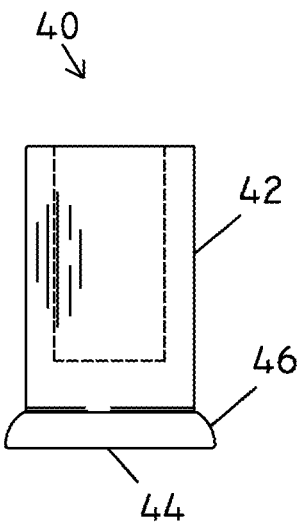
FIG. 4A is a side sectional view of a first example plunger having rounded wipers.

Several examples of wiper portions of the plungers will now be described. A side sectional view of a first example plunger having rounded wipers is shown in FIG. 4A. The plunger, generally referenced 40, comprises a body 42, wiper 46 and bottom surface 44. In this embodiment, the wiper has rounded corners.

Figure 4B:
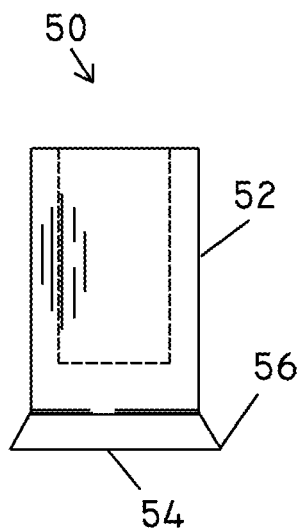
FIG. 4B is a side sectional view of a second example plunger having pointed wipers.

A side sectional view of a second example plunger having pointed wipers is shown in FIG. 4B. The plunger, generally referenced 50, comprises a body 52, wiper 56 and bottom surface 54. In this embodiment, the wiper has a smooth sloping shape to a substantially pointed bottom portion.

Figure 4C:
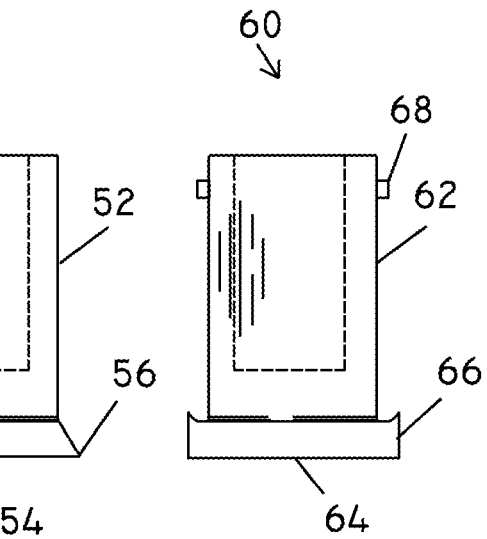
FIG. 4C is a side sectional view of a third example plunger with having concave shaped wipers.

A side sectional view of a third example plunger with having concave shaped wipers is shown in FIG. 4C. The plunger, generally referenced 60, comprises a body 62, wiper 66 and bottom surface 64. In this embodiment, the wiper has a concave shaped top portion for more efficient scraping of food off the inner walls of cells. In addition, the wiper comprises optional ribs 68 which function to aid in guiding the plunger in travel within a cell. These are located substantially at the opposite end of the plunger to provide stability for travel of the plunger in a cell.

Figure 4D:
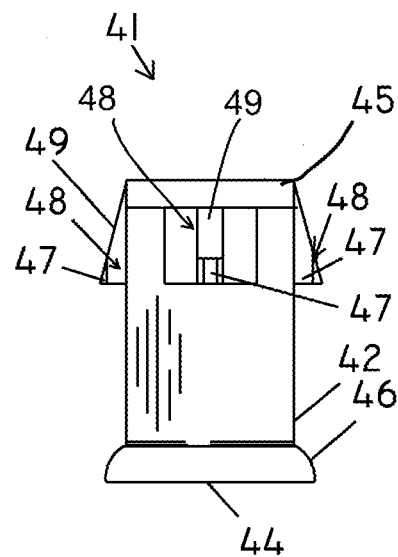
FIG. 4D is a side sectional view of a fourth example plunger having retaining tabs.

A side sectional view of a fourth example plunger having retaining tabs is shown in FIG. 4D. The plunger, generally referenced 41, comprises a body 42, wiper 46, bottom surface 44, top portion 45 and retention mechanism 48. The retention mechanism comprises tabs 47 and 49. In this embodiment, the plunger includes the retention mechanism to aid in keeping the plungers in the cells of the cutter. In one embodiment, the tabs 47 and 49 mate with the slot 25 (FIG. 2) on one or more inner walls of each cell.

Figure 4E:
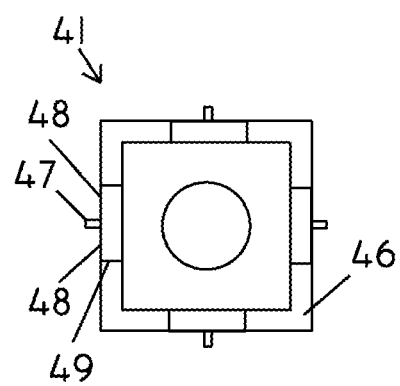
FIG. 4E is a top plan view of the fourth example plunger of FIG. 4D.

A top plan view of the fourth example plunger of FIG. 4E is shown in FIG. 4E. The portion of the plunger 41 shown includes retention mechanism 48, including tabs 47, 49, and wiper 46.

In alternative embodiments, the wipers may have any suitable shape on the top, mid and bottom sections. For example, the wipers may have concave shapes on both the top and bottom portions while the mid portion may be indented. This allows for more efficient scraping of food off the inner walls on both the down stroke and upstroke of the plungers within the cells.

Figure 5:
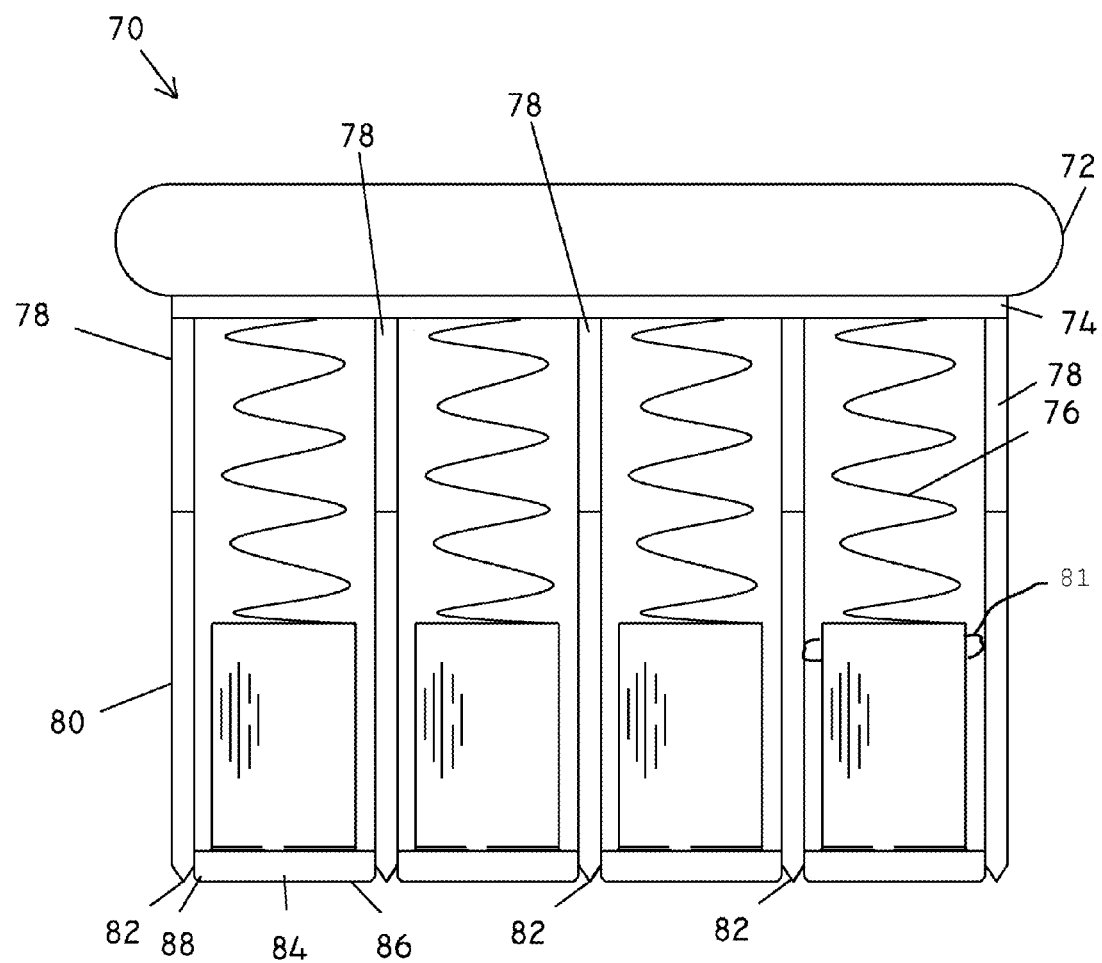
FIG. 5 is a side sectional view of the chopper.

A side sectional view of the chopper is shown in FIG. 5. The chopper, generally referenced 70, comprises a housing 72, a support backing or plate 74, a spring mechanism, cutter extension or support 78, cutter 80, cutting edges 82 and plungers 84. In one embodiment, the spring mechanism includes a plurality of springs 76 which bias each corresponding plunger in an extended position such that a bottom surface (e.g., an anvil surface) 86 of the each plunger can contact and/or exert a force on a food product in use. Each plunger may include the bottom plunger surface 86, a wiper 88 and one or more optional ribs 81 (shown only on one plunger for clarity). In use, each plunger is disposed in its own corresponding cell and may be coupled to the plate 74 by a corresponding spring of the springs 76. In the example embodiment shown, the backing for the spring mechanism is provided by the plate 74. When cutting, the plungers travel up (e.g., telescope) in their cells and compress their corresponding spring of the springs 76. The plate functions as the backing for the spring mechanisms so that the springs may provide a biasing force against the plate. Note that alternatively, the support for the springs may be provided by the housing itself. In this embodiment, the housing thus provides a triple function of a handle for the user, housing for the internal components and backing support for the plunger springs. Thus, the housing should be shaped and/or sized such that it may be easily grasped by a user.

In another embodiment, the plungers comprise ribs 81 on a portion of the plungers or extending fully around the circumference of the plunger. The ribs may be configured to act as a guide to support the smooth travel of the plunger up and down in a cell. The ribs, which may be situated at the top portion of the plungers, may also perform a wiping function to complement the squeegee action of the wipers 88 on the bottom portion of the plungers.

The cutter extension or support 78 is an optional portion of the cutter assembly. In one embodiment, the function of the support is to provide a base to securely mount the blade portions and/or to mount the cutter to the housing (e.g., see FIG. 1A). Depending on a depth of the cells of the cutter, the support 78 may extend the depth of the cells to a sufficient depth to accommodate the plungers when in a fully compressed position of its travel. The support portion 78 may be made of any suitable material such as plastic, metal, etc. In one embodiment, the blade portions of the cutter may be made of metal or steel having a part of the cell depth while the support 78 is made of plastic (e.g., a less costly material) and provides the remaining cell depth to the cells to accommodate the full travel of the plungers within the cells. Further, the support portion may be coupled to the blade portions using any suitable method such as bonding, welding, rivets, adhesives, etc.

Figure 6:
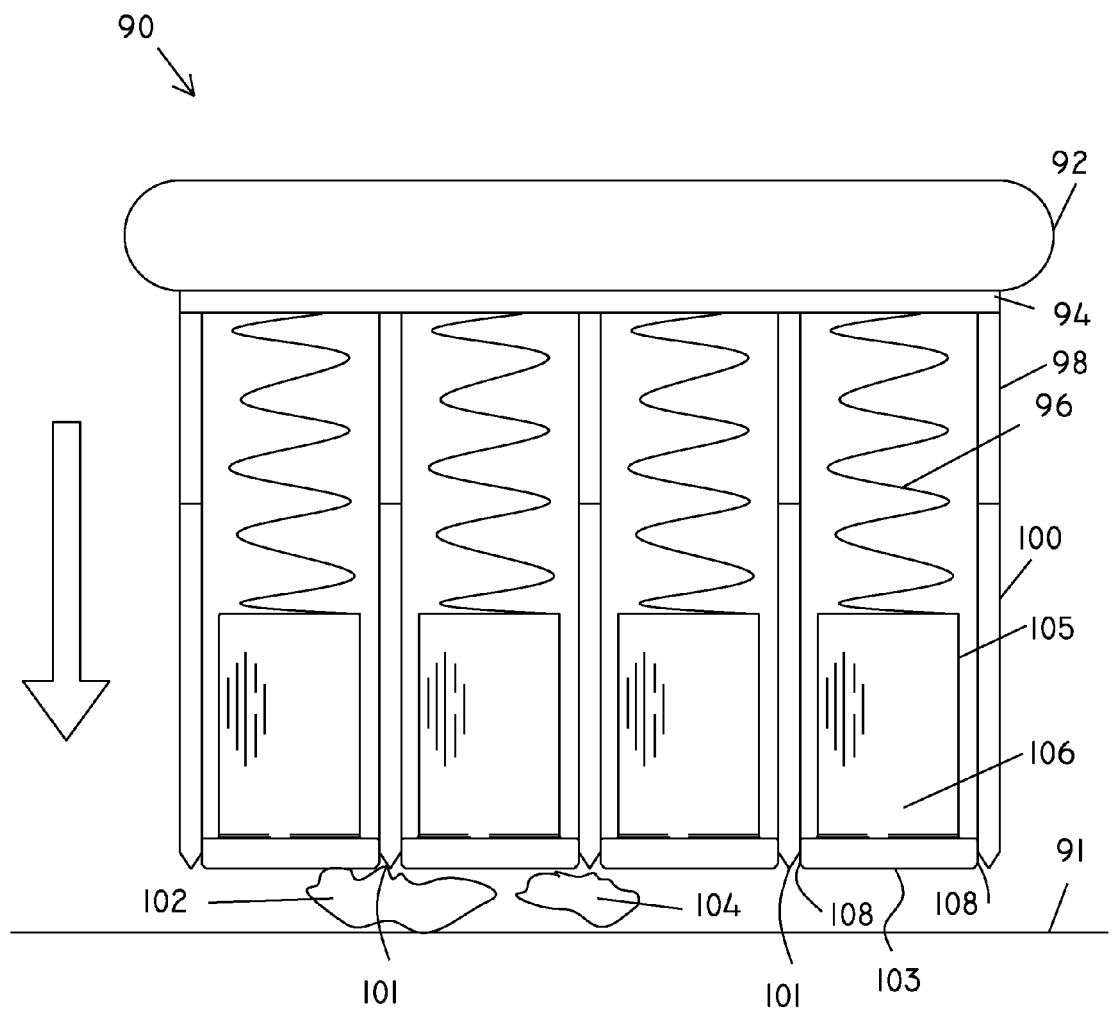
FIG. 6 is a side sectional view of the chopper at the beginning of a chopping cycle.

A side sectional view of the chopper at the beginning of a chopping cycle is shown in FIG. 6. The chopper, generally referenced 90, comprises a housing 92, a support backing or plate 94, a plurality of springs or other compressible spring mechanisms 96, a cutter extension or support 98, cutter 100, cutting edges 101 and plungers 106. Each plunger comprises a body 105, a bottom plunger surface 103 and a wiper 108.

In use, the food chopper 90 is placed over the food a user wishes chopped or cut (e.g., garlic, nuts, orange peel, etc.), which is placed on table or surface 91. For example, consider two food items 102, 104. Before any downward force is exerted on the chopper, the plungers are all in an uncompressed state. The plungers are disposed within the cutter cells such that their bottom surfaces 103 are substantially flush with the cutting edges 101 of the cutter 100. This provides the double benefits of (1) minimizing waste and (2) allowing for easy cleanup. It is appreciated that relatively small crevices or nooks may be present depending on the design and manufacturing of the chopper. These crevices, however, are small and do not appreciable contribute to food waste. In yet other embodiments the plungers may be slightly recessed or slightly extend outward from the cutting edges of the cutter. At this time, a user may exert a force upon the housing so as to urge the edges of the cutter against the two food items and may continue to exert a force against the two food items so as to cut the two food items.

Figure 7:
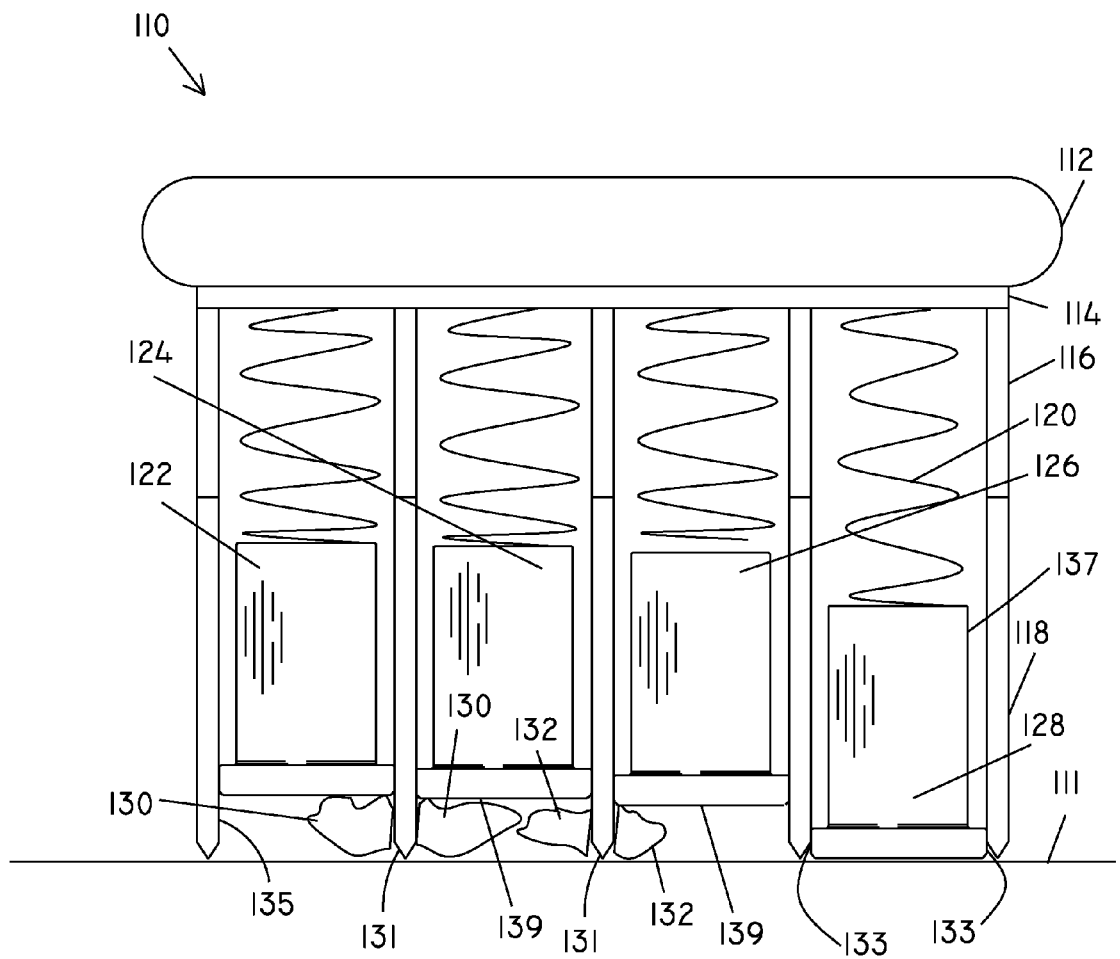
FIG. 7 is a side sectional view of the chopper at the approximate middle of a chopping cycle.

A side sectional view of the chopper at approximately the midpoint of a chopping cycle is shown in FIG. 7. The chopper, generally referenced 110, comprises a housing 112, a support backing or plate 114, a spring or other compressible spring mechanism 120, a cutter extension or support 116, a cutter 118, cutting edges 131 and plungers 122, 124, 126 and 128. Each plunger comprises a body 137, bottom plunger surface 139 and wiper 133.

At this mid-point in the chopping cycle, the user has applied downward force to the housing 112 sufficient for the cutter blades to cut, slice, and/or chop the food items 130, 132. Edges 131 of the cutting blades are forced downward towards the surface 111 on which the food is being chopped, such as a cutting board, table, countertop, etc. The chopping action ceases when the cutter edges meet the cutting surface 111. As downward force is applied by the user, the food items are chopped and at the same time exert an upward force on the bottom of the plungers. As a result of contract with the food, those plungers that contact food items travel upwardly within their cell and compress their associated spring mechanism.

Note that in one embodiment, all plungers are independently suspended within the cutter, i.e. each plunger has its own spring, allowing only those plungers that contact food to move. For those plungers, each travels a distance within its cell in accordance with the size of the food item. Those plungers that do not contact food remain in their uncompressed position where the plunger bottom surface is substantially flush with the cutting edges. Note that during the chopping process, it is likely that some food particles are likely to stick to the inner walls 135 of those cells that contact food. These food particles are wiped from the inner walls by the squeegee action of the wipers on the plungers when the chopper is lifted up, as described in more detail infra.

Figure 8:
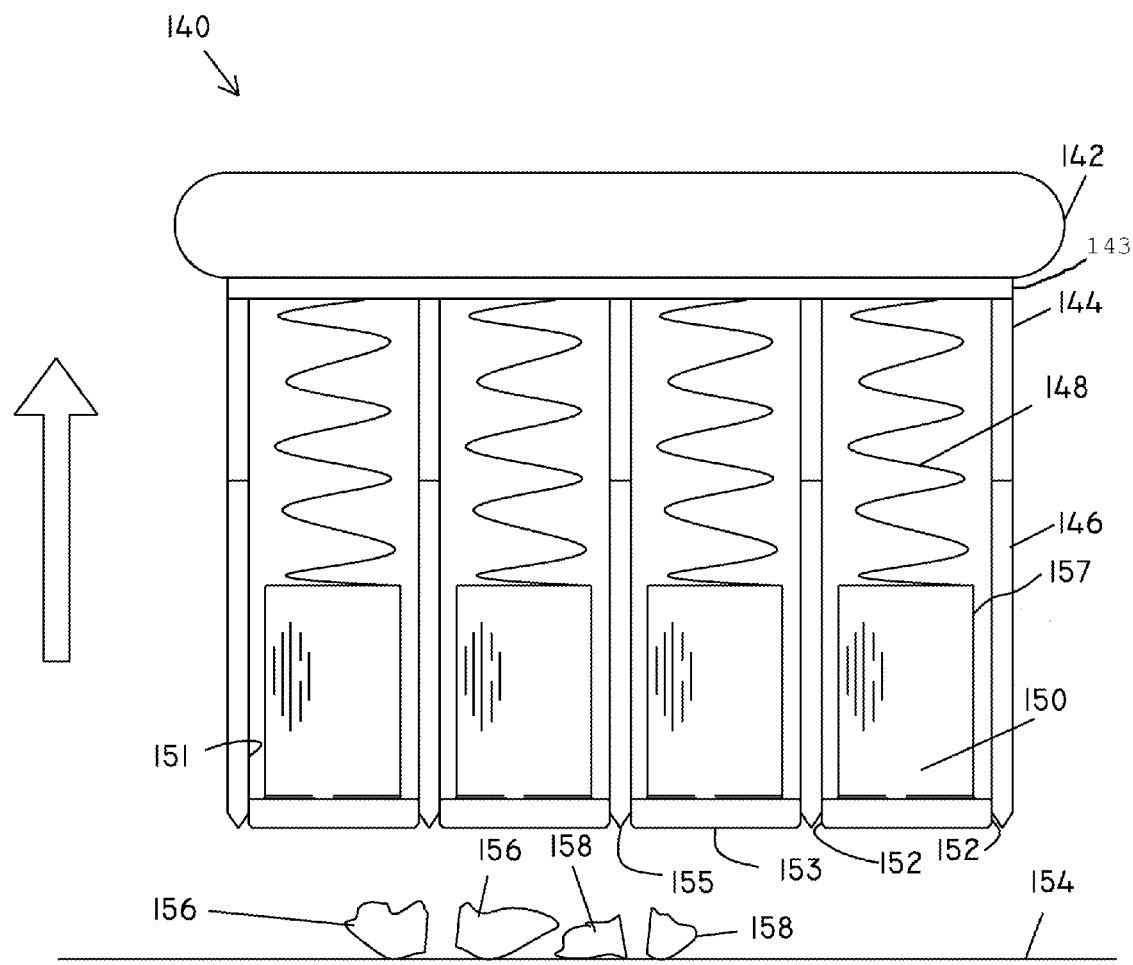
FIG. 8 is a side sectional view of the chopper at the end of a chopping cycle.

A side sectional view of the chopper at the end of a chopping cycle is shown in FIG. 8. The chopper, generally referenced 140, comprises a housing 142, a support backing or plate 143, a plurality of springs or other compressible spring mechanisms 148, cutter extension or support 144, cutter 146, cutting edges 155 and plungers 150. Each plunger comprises a body 157, bottom plunger surface 153 and wiper 152.

In use, after the chopper 140 has chopped the food, the user lifts the chopper off the chopping surface 154. As the chopper is lifted, the compressed springs in those cells whose plungers were compressed force their respective plungers back to the idle position flush with the cutting edges. It is in the idle position that the springs or spring mechanisms are fully extended in an uncompressed state.

During the lifting action, the wipers on each plunger squeegee any food sticking to the inner walls 151 of a cell. The chopped food 156, 158 is forced out of the cell and typically remains on the bottom surface of the plunger. A user can then quickly and easily pass a flat edged utensil such as the back end of a knife across the bottom surface of the chopper and remove any remaining chopped food from the bottom surfaces of the plungers.

Note that the springs or spring mechanisms may comprise any suitable material or mechanism that provides sufficient counter force to achieve the squeegee action of the wipers against the inner walls of the cells. The springs or spring mechanism, however, cannot be so stiff that it is difficult or impossible for the plungers to move in their cells during a chopping cycle. Thus, the spring mechanisms may provide a biasing force to return each plunger to its fully extended position after being retracted by an article of food situated between the chopping surface and a corresponding plunger.

Further, in some embodiments the backing or plate (e.g., see 143) may be formed integrally with the housing. Moreover, in some embodiments it is envisioned that the biasing members may be formed integrally with a corresponding plunger.

Note also that the cutter may comprise any desired number of cells depending on the application. For example, a single large cell with one plunger may be used to cut or chop large pieces of food. In one embodiment, the cutter and cutting edges are formed to have a decorative shape which may be used to cut dough in the preparation of baked food, e.g., cookies, cakes, etc.

Thus, by the squeegee action of the wipers in each cell, and by placing the wipers substantially at the bottom portion of the plungers close to the cutting edges, the food chopper of the present invention exhibits very efficient chopping with minimal waste and a self-cleaning mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A food chopper for chopping foodstuff, comprising:
   a housing;
   a cutting grid having a plurality of cutting edges arranged to form a plurality of cells, each of the cells having a plurality of inner walls;
   a plurality of plungers, each of the plungers having a wiper portion in contact with the inner walls of a respective ones of said cells;
   a spring coupled to each of the plungers whereby each of the plungers is independently suspended and springedly moveable within the respective ones of said cells; and
   wherein the wiper portion of each of the plungers is operative to remove food from the inner walls of the respective ones of said cells in response to a downward movement of the plungers due to lifting of the housing off a chopping surface by a user.

2. The chopper according to claim 1, wherein a bottom surface of each of the plungers is substantially flat and smooth.

3. The chopper according to claim 1, wherein said plurality of cutting edges are configured such that each of the cells has a rectangular shape.

4. The chopper according to claim 1, wherein said cutting grid is removeably fixed to said housing.

5. The chopper according to claim 1, wherein a first end of each of the springs is in contact with said housing and a second end of each of the springs is in contact with a corresponding one of the plungers.

6. The chopper according to claim 1, wherein a downward force applied to said housing against foodstuff causes:
   upward movement of one or more of the plungers in contact with said foodstuff;
   compression of the springs associated therewith; and
   the foodstuff to be chopped.

7. The chopper according to claim 1, wherein a downward force applied to said housing against foodstuff causes:
   corresponding ones of the plungers to compress the springs associated therewith which thereby increases biasing forces against the corresponding ones of the plungers as the corresponding ones of the plungers move upwards in the respective ones of the cells and the foodstuff is chopped by the cutting edges.

8. The chopper according to claim 1, wherein lifting of the housing off a chopping surface by a user after a cutting action causes the springs in one or more of the respective ones of the cells to restore leading to a springed return of the corresponding ones of the plungers to their original position and cleaning of food from the inner walls of cells by squeegee action of said wiper portions.

9. The chopper according to claim 1, wherein a bottom surface of each of the plungers is substantially flush with said cutting edges when the spring in each of the cells is in a substantially uncompressed idle state.

10. A food chopper for chopping foodstuff, comprising:
    a housing;
    a cutting grid having a plurality of cutting edges arranged to form a plurality of four sided cells, each of the cells having four inner walls;
    a plurality of independently suspended plungers, each of the plungers having a wiper portion in contact with the inner walls of respective ones of said cells,
    a spring coupled to each of the plungers whereby each of the plungers is independently suspended and moveable within its corresponding cell;
    wherein a downward force exerted upon the housing by a user against a chopping surface causes upward movement in the cells of corresponding one or more of the plungers thereby compressing associated ones of the springs and the food stuff to be chopped via the cutting edges; and
    wherein lifting of the housing off the chopping surface by the user restores the associated springs causing downward movement of the corresponding one or more plungers in contact with the foodstuff, and the wiper portion of each of the corresponding one or more plungers to squeegee off foodstuff sticking to the inner walls of the respective ones of said cells.

11. The chopper according to claim 10, wherein a bottom surface of each of the plungers is substantially flat and smooth.

12. The chopper according to claim 10, wherein each of said four sided cells are rectangularly shaped.

13. The chopper according to claim 10, wherein said cutting grid is removeably fixed to said housing.

14. The chopper according to claim 10, wherein a first end of each of the springs is in contact with said housing and a second end of each of the springs is in contact with a corresponding one of the plungers.

15. The chopper according to claim 10, wherein each of said plungers comprises ribs located substantially at a distal end of each of the plungers for slideably mating with corresponding slots in each of the cells said ribs and corresponding slots operative to aid in guiding the movement of each of the plungers in the respective ones of said cells.

16. The chopper according to claim 10, wherein the bottom surface of said plungers are substantially flush with said cutting edges when the spring in each of the cells is in a substantially uncompressed idle state.

17. A food chopper for chopping foodstuff, comprising:
   a housing;
   a cutting grid having a plurality of cutting edges arranged to form a plurality of cells, each of the cells having a plurality of inner walls;
   a plurality of independently suspended plungers, each of the plungers having a wiper portion in contact with the inner walls of respective ones of said cells;
   a biasing member coupled to each of the plungers whereby each of the plungers is independently suspended and moveable within the respective ones of said cells;
   wherein a downward force exerted upon the housing by a user against a chopping surface causes upward movement in the cells of corresponding one or more of the plungers thereby compressing associated ones of the biasing members and the food stuff to be chopped via the cutting edges; and
   wherein lifting of the housing off the chopping surface by the user restores the associated biasing members causing downward movement of the corresponding one or more plungers in contact with the foodstuff, and the wiper portion of each of the corresponding one or more plungers to squeegee off foodstuff sticking to the inner walls of the respective ones of said cells.

18. The food chopper according to claim 17, wherein a bottom surface of each of the plungers is substantially flush with said cutting edges when biasing member in each of the cells is in a substantially uncompressed idle state.

* * * * *